United States Patent
Schilf

(10) Patent No.: US 7,216,261 B2
(45) Date of Patent: May 8, 2007

(54) METHOD FOR CONTROLLING A PROGRAM RUN OF A CENTRAL DATA PROCESSOR

(75) Inventor: Thomas Schilf, Heidelberg (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 504 days.

(21) Appl. No.: 10/109,921

(22) Filed: Mar. 28, 2002

(65) Prior Publication Data

US 2002/0144237 A1    Oct. 3, 2002

Related U.S. Application Data

(60) Provisional application No. 60/289,455, filed on May 8, 2001.

(51) Int. Cl.
  *G06F 11/00*    (2006.01)
(52) U.S. Cl. ......................... 714/39; 717/127
(58) Field of Classification Search .................. 714/38, 714/39, 40, 45, 46; 717/124, 126, 127, 128
See application file for complete search history.

(56) References Cited

U.S. PATENT DOCUMENTS

| | | | | |
|---|---|---|---|---|
| 4,683,549 A | * | 7/1987 | Takaki | 712/244 |
| 4,704,704 A | * | 11/1987 | Sato et al. | 714/46 |
| 5,724,564 A | * | 3/1998 | Conder et al. | 712/234 |
| 6,643,630 B1 | * | 11/2003 | Pegatoquet et al. | 706/45 |
| 6,918,106 B1 | * | 7/2005 | Burridge et al. | 717/100 |

* cited by examiner

*Primary Examiner*—Dieu-Minh Le
(74) *Attorney, Agent, or Firm*—Laurence A. Greenberg; Werner H. Stemer; Ralph E. Locher

(57) ABSTRACT

A method for controlling a program run of a central data processor includes the step of starting a master program by an operating system. In accordance with given data, the master program starts a number of programs in a given sequence. The master program also checks the correct functioning of the start and initialization phase of the programs and the correct functioning of the programs after the start and initialization phase. If an error function is recognized, the master program initiates a reaction function. For example, a reaction function is when a following program is not started, when the previous program has not completed the start and initialization phase correctly. A printing press and a storage medium are also provided.

21 Claims, 4 Drawing Sheets

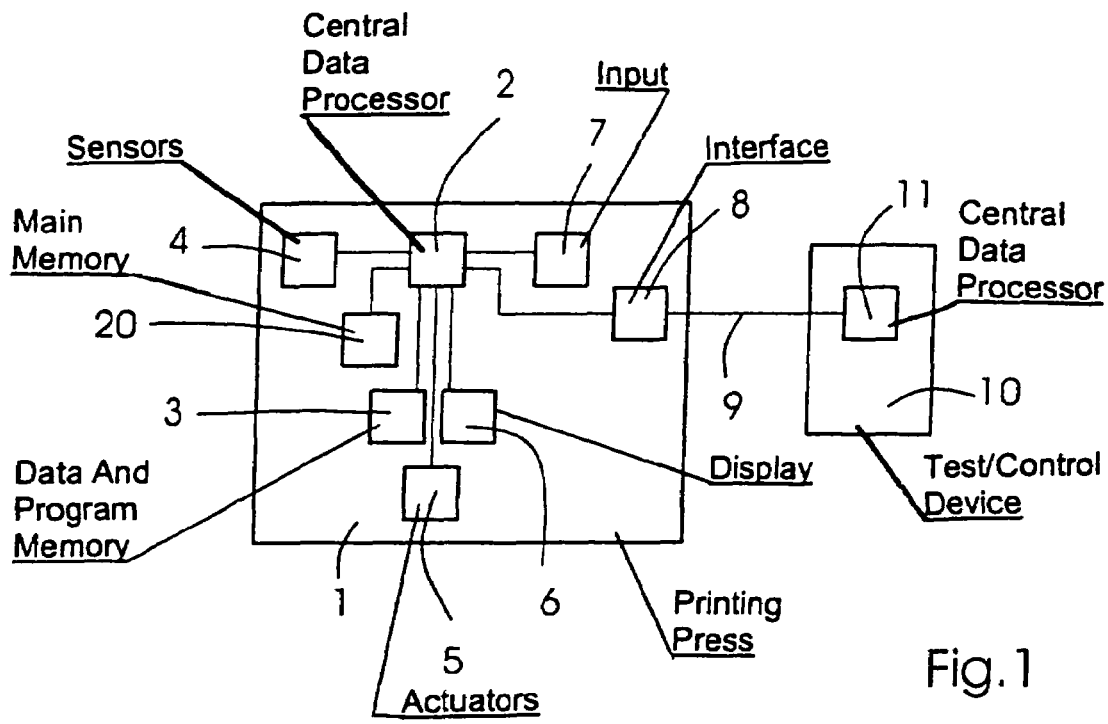
Fig.1
Fig.2
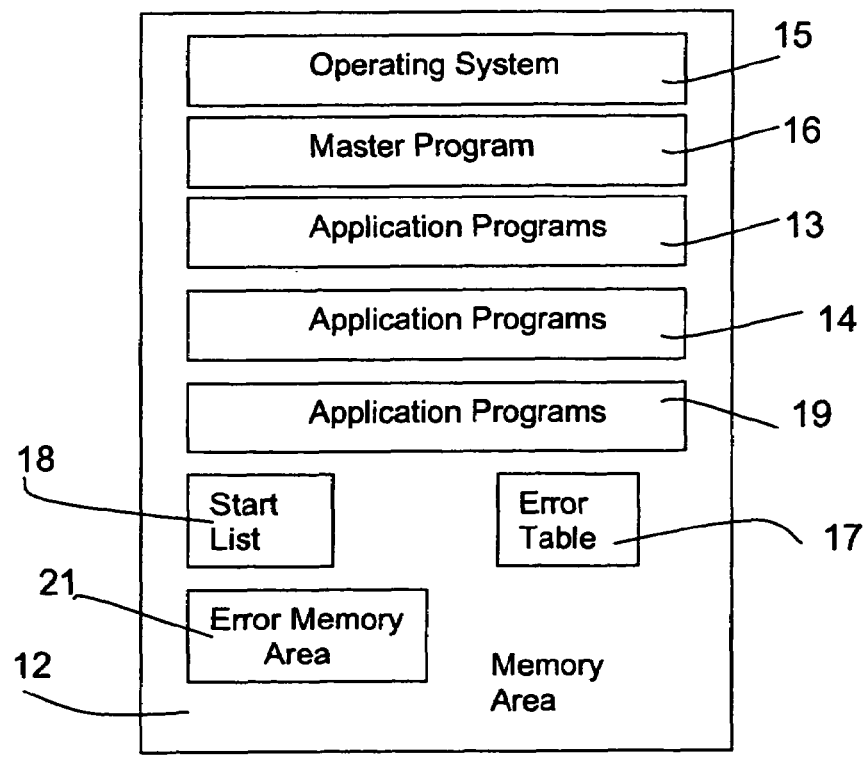

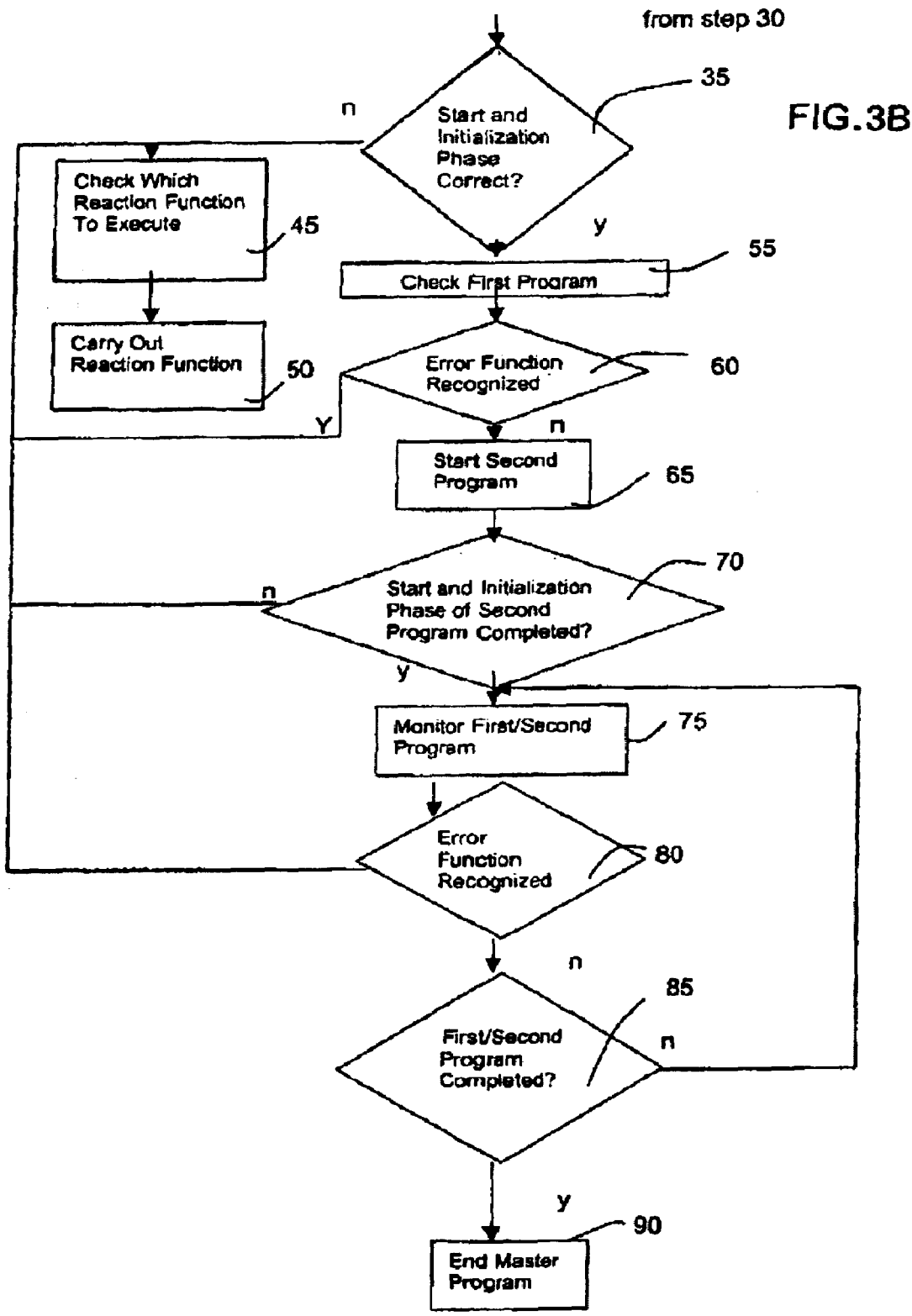

METHOD FOR CONTROLLING A PROGRAM RUN OF A CENTRAL DATA PROCESSOR

CROSS-REFERENCE TO RELATED APPLICATIONS

This application claims the benefit of copending Provisional Application No. 60/289,455, filed May 8, 2001; this application further claims the priority, under 35 U.S.C. §119, of German application DE 101 15 494.1, filed Mar. 29, 2001; the prior application is herewith incorporated by reference in its entirety.

BACKGROUND OF THE INVENTION

Field of the Invention

The invention relates to a method for controlling a program run of a central data processor. The invention further relates to a printing press having a central data processor. The invention also relates to a storage medium having processor-readable and executable programs.

Program runs or program flows are used in the printing industry, for example, in order to control a printing press according to prescribed methods. An exact monitoring of the programs to be processed is advantageous, since it is necessary to precisely process the programs particularly when used for printing presses.

For example, script-based application programs are known for starting programs, whereby script-based programs can be started only with a delay in time and the program is not monitored with respect to a correct functioning of the programs.

It is also known that the operating system WINDOWS provides a Startup group, whereby the Startup group contains programs that are automatically started when the operating system WINDOWS is started. A defined sequence, however, is not guaranteed when the programs deposited in the Startup group are started. The started programs are not controlled either.

Furthermore, it is known from the program Taskmanager of the WINDOWS operating system to monitor started programs with the aid of the Taskmanager. It is thereby possible to recognize the operational status of a program. For example, a correct functioning of the program or a crash of the program is recognized as an operational status. Program errors are not recognized prior to the input of a user. The Taskmanager is also capable of closing only one program or of bringing down the central data processor and to carry out a restart, for example.

SUMMARY OF THE INVENTION

It is accordingly an object of the invention to provide a method for controlling a program run which overcomes the above-mentioned disadvantages of the heretofore-known methods of this general type and which provides more information about the programs and/or is more flexible concerning the treatment of programs.

With the foregoing and other objects in view there is provided, in accordance with the invention, a method for controlling a program run of a central data processor, the method includes the steps of:
initially starting a master program;
checking, with the master program, which ones of a plurality of programs are to be started based on a list;
reading out, with the master program, a start sequence of the programs to be started from a table;
starting, with the master program, the programs to be started according to the start sequence; and
monitoring a functioning of the programs.

In other words, according to the invention, a method for controlling the program run of a central data processor, whereby a plurality of programs are started and their functioning is monitored, is characterized in that a master program is initially started, the master program checks on the basis of a list which programs are to be started, the master program reads out a start sequence of the programs from a table, and the master program starts the programs corresponding to the sequence.

An advantage of the invention is that a master program is provided, which starts prescribed programs according to a fixed sequence. It is thus assured that the prescribed sequence is maintained when the programs are started. This course of action is particularly advantageous when the correct functioning of a second program is dependent on a first program running correctly and/or having been started correctly.

According to a simple mode of the invention, the master program waits for a fixed period of time after a first program has been started and does not start a second program before the fixed period of time has been completed. In this embodiment, the period of time makes it highly probable that the first program has successively completed a start and initialization process before the second program is started. This is particularly advantageous when the second program is dependent on a correctly functioning first program.

In another preferred mode of the invention, the master program checks whether the first program has correctly run through a start and initialization phase. The master program does not start a second program before a start and initialization phase has been run through correctly. Since the start and initialization phase is checked, it is assured that the second program is started only when the first program actually runs fully operative.

In a preferred mode of the invention, it is checked whether a start and initialization phase has been run through correctly in that it is determined whether the first program reacts to inputs, or whether the first program exchanges prescribed data with another program, preferably with the operating system. Since the functioning of the first program is specifically checked, it is assured that an erroneously operating first program is definitely recognized.

Another preferred mode of the method according to the invention is that the master program checks whether a started program functions properly and generates an error signal given an error function of the started program. The generated error signal indicates that a started program does not function correctly. The user is informed about the error signal preferably in the form of an optical display or acoustic display. In another embodiment, the error signal can also be stored into a fault storage. The fault storage is read out and corresponding error signals are determined when the central data processor is checked later.

In a preferred mode of the invention, the master program checks the operativeness of a started program in that the system performance utilized by the started program in the central data processor is checked. For example, a performance-counter value is checked on the basis of the operating system WINDOWS. If the performance-counter value is below a fixed comparative value, the program does not use sufficient system performance and therefore does not function properly. If the performance-counter value exceeds a fixed maximum comparative value, this can indicate that the program uses too much system performance of the central data processor and therefore does not function properly.

The program is simply checked with respect to a correct functioning in that it is checked whether the program reacts to signals of the operating system. In particular, the performance-counter value is evaluated as a response to a signal of the operating system under the operating system WINDOWS.

The program is further checked in that it is determined whether the program outputs data. If the program does not output data or outputs too few or too many data, an error function of the program is recognized. The comparative values for evaluating whether too many data or too few data are output are determined in a test phase.

In another mode of the invention, an identifier for a started program is entered into a register list and the operating system monitors the correct functioning of the started program using a monitor program. The identifier of the faulty program is forwarded to the master program when an error function of the started program is recognized. The master program checks whether the registered program is to be monitored by the master program. The master program outputs an error signal when it recognizes that the registered program is a program to be monitored.

Another mode of the method according to the invention includes monitoring, with an operating system, a correct functioning of started ones of the programs; outputting, with the operating system, an error signal to the master program when one of the programs malfunctions; checking, with the master program, whether the one of the programs that malfunctions is a program that is to be monitored by the master program; and outputting, with the master program, an error signal if the one of the programs that malfunctions is a program to be monitored by the master program.

In a preferred mode of the invention, the master program starts a prescribed reaction function after an erroneously running program has been recognized. For example, the termination of the faulty program is performed as a reaction function. In a further mode according to the invention, the master program restarts the faulty program after the faulty program has been completed.

Another advantageous embodiment of the reaction function is that the master program carries out a restart of the entire operating system of the central data processor.

It is also advantageous that the master program transmits an error message as reaction function to a further central data processor, which is connected to the central data processor in which the master program runs. It is thus assured that the further central data processor, which exchanges data with the central data processor, is informed given an error function. It is, therefore, guaranteed that the further central data processor recognizes a corresponding error function of the central data processor and potentially carries out corresponding reaction functions.

Another mode of the invention includes, subsequently to terminating the faulty one of the programs, restarting, with the master program, the faulty one of the programs.

According to another mode of the invention, the step of performing the reaction function includes entirely restarting, with the master program, an operating system of the central data processor.

According to yet another mode of the invention, the step of performing the reaction function includes transmitting, with the master program, an error message to a further central data processor connected to the central data processor.

According to another mode of the invention, the step of performing the reaction function includes generating, with the master program, an indicator window on a screen such that the indicator window contains an error indication.

Another mode of the invention includes using application programs as the programs.

With the objects of the invention in view there is also provided, a printing press, including:

a central data processor having a memory with programs stored therein; and the central data processor being programmed to run the programs such that initially a master program is started, such that the master program checks which ones of the programs are to be started based on a list, such that the master program reads out a start sequence for the programs to be started from a table, such that the master program starts the programs to be started according to the start sequence and such that a functioning of the programs is monitored.

With the objects of the invention in view there is also provided, a storage medium having processor-readable and executable programs for performing a method which includes the steps of:

initially starting a master program;

checking, with the master program, which ones of a plurality of programs are to be started based on a list;

reading out, with the master program, a start sequence of the programs to be started from a table;

starting, with the master program, the programs to be started according to the start sequence; and monitoring a functioning of the programs.

Other features which are considered as characteristic for the invention are set forth in the appended claims.

Although the invention is illustrated and described herein as embodied in a method for controlling a program run of a central data processor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic block diagram of a printing press according to the invention having a central data processor;

FIG. 2 is a schematic view of a memory area;

FIGS. 3A and 3B show a flow diagram illustrating a program run for processing the method for controlling a program run according to the invention.

DESCRIPTION OF THE PREFERRED EMBODIMENTS

Figure 3A:
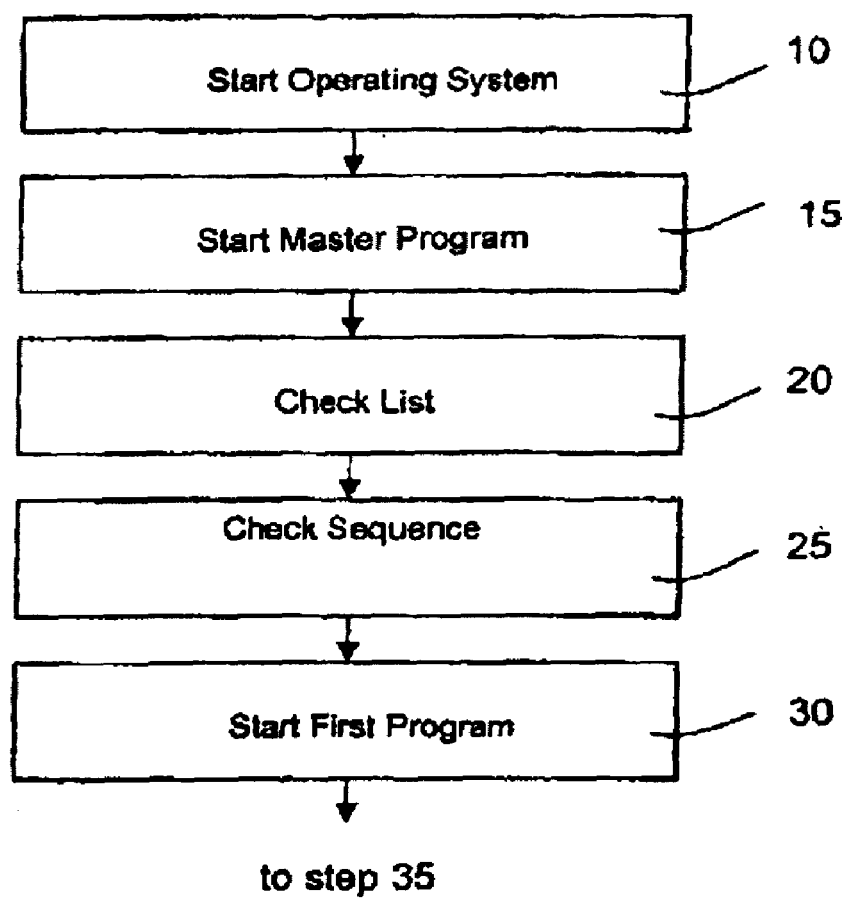

Referring now to the figures of the drawings in detail and first, particularly, to FIG. 1 thereof, there is shown an exemplary embodiment of a printing press 1. However, the invention is independent of the application with respect to a printing press 1 and can be used in every central data processor with which program runs are controlled.

FIG. 1 shows a printing press 1 having a central data processor 2, a data and program memory 3, sensors 4, actuators 5, a display 6, an input 7, a main memory 20 and an interface 8. The exact construction of the printing press 1 is not critical for the invention and therefore is not explained in greater detail in the specification. The sensors 4 and the actuators 5 represent the essential functioning of the printing press 1. For example, a ink zone and ink duct roller motor or an imaging electronic device are provided as actuators 5. Every other type of actuator applied in printing press 1 can also be provided. The central data processor 2 is connected, with corresponding lines, to the data and program memory 3, the sensors 4, the actuators 5, the display 6, the input 7, the main memory 20 and the interface 8. The interface 8 is connected via a line 9 to a second central data processor 11 provided in a device 10. The second central data processor 11 exchanges data and/or control programs, via the interface 8, with the central data processor 2. For example, a test or control device can be fashioned as device 10.

The central data processor 2 controls the printing press 1. The central data processor 2 has an operating system, a master program and application programs. The operating system controls the input and output of data and the processing of the master program and the application programs. The master program serves the purpose of starting the application programs and of monitoring the correct functioning of the application programs. The application programs are programs for an ink control of the printing press, for controlling the imaging, for controlling the operating surface or are programs for the system control, for example. A color control or ink control has a program, for example, for controlling ink zones and ink duct roller motors dependent on an adjusted color profile and the printing speed of the printing press. An imaging control has a program, for example, for driving the imaging electronic device (DI).

For example, programs for visualizing the status of the printing press and for controlling machine components are utilized for controlling the user interface or operating surface. For example, washing devices, registers, feeder devices, delivery devices, printing mechanisms and driers are considered machine components.

Programs for realizing complex processes are provided for the system control, whereby these programs are started by an input via an operating surface or user interface. For example, predefined actions are activated in control modules such as the color control, the imaging control or the operating surface (user interface). The operating system, the master program and the application programs are deposited in the data and program memory 3.

FIG. 2 shows a schematic structure of a memory area 12 of the data and program memory 3. The operating system 15, the master program 16, a first application program 13, a second application program 14 and a third application program 19 are stored in the memory area 12. Furthermore, the memory area 12 has an error table 17 and a start list 18. The sequence in which the first, second and third application program 13, 14, 19 are started by the master program is fixed in the start list 18. For this purpose, a corresponding index, which fixes the sequence when the application programs are started, is allocated to each program, for example.

An allocation of prescribed error situations and reaction functions prescribed for this purpose is deposited in the error table 17. If the master program 16 recognizes an error situation that is deposited in the error table 17, the master program 16 executes the reaction function allocated to the error situation.

The invention is subsequently described in greater detail on the basis of FIGS. 3A and 3B. The central data processor 2 starts the operating system at program point 10. The central data processor 2 reads the operating system from the memory 3 into a main memory 20, which is provided in the central data processor 2, when the current supply is switched on, for example. The operating system carries out an initialization of the central data processor 2. Subsequent to the initialization of the central data processor 2, the operating system starts the master program 16 at the following program point 15. The central data processor 2 reads the master program 16 from the memory 3 into the main memory 20. After the master program has been started at program point 15, the master program checks the list of the application programs to be started at the following program point 20. In this exemplary embodiment, the master program recognizes that three application programs 13, 14, 19 are deposited in the memory area 12. Subsequent to the determination of the application programs to be started, the master program checks at the following program point 25 in which sequence the application programs are to be started. For this purpose, the master program 16 reads the sequence out of the start list 18. A number determining the sequence, in which the corresponding application program is started, is allocated in the start list 18 preferably to each of the three programs 13, 14, 19. In the described exemplary embodiment, the number 1 is allocated to the first program 13, the number 2 is allocated to the second program 14 and the number 3 is allocated to the third program 19. The master program 16 correspondingly recognizes that the first program 13 is to be started first, followed by the second program 14 and thereafter by the third program 19.

The master program starts the first program 13 at the following program point 30. For this purpose, the master program outputs a corresponding command to the central data processor 2 to jump to the start address of the first program 13 and to execute the commands deposited at the start address. After the first program 13 has been started, the master program checks at the following program point 35 whether the first program has correctly run through a prescribed start and initialization phase. The master program 16 has a number of possible procedures in order to recognize whether the start and initialization phase of the first program has been completed. For example, the master program 16 checks whether the first program reacts to inputs that are entered via the input 7. In a preferred embodiment, the master program 16 itself initializes test inputs to the first program and waits for a corresponding reaction of the first program. If the first program does not react in a prescribed manner, the master program 16 recognizes that the first program 13 has not correctly completed the start and initialization phase.

In another embodiment of the invention, the master program checks whether the first program outputs prescribed data to the operating system. For this purpose, the program 13 has a corresponding method step deposited after the start and initialization phase has been completed, whereby the first program outputs prescribed data to the operating system. If the master program 16 does not recognize the output, the start and initialization phase has not been completed correctly.

It is further checked whether the start and initialization phase has been completed correctly in that the master program 16 checks whether the first program 13 reacts to requests or data of the operating system 15. For checking a reaction of the first program, it is checked under the operating system WINDOWS, for example, which values a performance-counter value has. For example, if the operating system outputs a request to the first program and the first program does not modify the performance-counter value after receipt of the request, it is thus indicated that the first program does not process the request. It is thereby recognized that the first program does not react to requests. This behavior indicates that a start and initialization phase has not yet been completed.

If the master program 16 recognizes at program point 35 that a start and initialization phase has not been completed, it is branched to program point 45.

The master program checks at program point 45, on the basis of the error table 17, which reaction function is to be executed as a result of the determined error. The master program takes into consideration both the checked application program representing the first program in this case and the type of error that occurred during the check of the first program. In the described exemplary embodiment, it has been recognized, for example, that the first program 13 has not completed a start and initialization phase. The reaction function that the master program ends the first program 13 and subsequently restarts the first program is allocated to this error situation in the error table 17, for example. The reaction function is carried out at the following program point 50. It is also provided that an error signal is produced and is deposited in an error memory area 21, for example. In another embodiment, the error signal is represented at the display 6 in the form of a display window. An error text describing the determined error function preferably is contained in the display window.

If the first program 13 therefore ends at program point 50 in the described exemplary embodiment, it is subsequently branched back to program point 30 at which the master program 16 restarts the first program.

In a simple embodiment, it is provided as reaction function that the master program ends the first program and subsequently branches it to program point 65.

In a further preferred embodiment, it is provided as reaction function that the master program brings down the entire operating system of the central data processor 3 and initiates a restart of the operating system. A jump back to program point 10 is performed after the operating system has been terminated at program point 50.

In a further development of the invention, the master program 16 additionally outputs a corresponding error message via the interface 8 to the further central data processor 11. In this way, the central data processor 11 receives the information that an error function has occurred at the central data processor 2. In a preferred embodiment, the further central data processor 11 is also informed of the type of the recognized error function. It is thus possible for the further central data processor 11 to carry out corresponding reaction functions itself.

If the result of the inquiry at program point 35 is that the start and initialization phase of the first program 13 has been carried out correctly, the first program 13 is subsequently checked at program point 55 with respect to correct functioning. For example, it is recognized whether the first program 13 functions properly in that a file, under the operating system WINDOWS, has been deposited with a program ID number for the program after the program has been started. A program can be unambiguously identified via the program ID number.

If the file of the program ID can be opened, the master program 16 recognizes that the program is active. The master program 16 further checks the correct functioning of the first program 13 in that it checks the system performance that is used by the first program 13 in the central data processor 2. For example, a performance-counter value is evaluated under the operating system WINDOWS. If the performance-counter value is below or above a fixed minimum value or, respectively, maximum value, an error function of the first program 13 is recognized. If the performance-counter value is situated between the fixed minimum value and maximum value, the master program 16 determines that the first program 13 functions correctly.

It is also possible for the master program 16 to check whether the first program 13 functions properly in that the master program 16 determines in which way the first program 13 reacts to data or requests of the operating system 15. For example, the chronological behavior of the performance-counter value also is evaluated under the operating system WINDOWS for this purpose. For example, if the operating system outputs a request to the first program 13, the system performance utilized in the central data processor 2 by the first program 13 must increase. If this is not the case, the master program 16 recognizes that the first program 13 does not react to the request. As a result thereof, an error function of the first program 13 is recognized.

Another, simple method is that the master program 16 checks whether the first program 13 transmits data. If the program 13 does not transmit data, an error function of the first program 13 is recognized.

The check of the first program 13 at program point 55 is followed by an inquiry at program point 60 with respect to whether an error function of the first program has been recognized. If this is the case, it is branched to program point 45. If it results from the inquiry at program point 60 that an error function of the first program 13 has not been recognized, program point 65 is processed. At program point 65, the master program 16 starts the second program 14 determined in the start list 18 as the program to be started second. The master program 16 subsequently monitors at program point 70 whether a start and initialization phase of the second program 14 has been completed. The same checking methods are used as for checking the completion of the start and initialization phase of the first program 13. If it results from the inquiry at program point 70 that a start and initialization phase has not been completed, it is branched to program point 45. An error situation recognized for the second program is processed at program points 45 and 50 in a way as deposited in the error table 17. The master program 16 checks which reaction functions are to be executed as a result of the error function determined at the second program 14. On the basis of the error table 17, the master program 16 checks the allocation of the determined error function to a fixed reaction function. Preferably, the reaction functions are fashioned similar with regard to the reaction functions of the first program 13. The first program 13 also ends when the operating system is completely restarted.

If the result of the inquiry at program point 70 is that the start and initialization phase has been successively completed, program point 75 is processed. The master program 16 monitors the correct functioning of the first program 13 or of the second program 14 at program point 75. The second program 14 is monitored similar to the first program 13. In order to determine whether the second program 14 functions properly, the same methods as for monitoring the correct functioning of the first program are preferably used.

It is subsequently determined at program point 80 whether an error function of the first program 13 and of the second program 14 has been recognized. If an error function of the first or the second program 14 has been recognized, it is subsequently branched to program point 45. The recognized error function of the second program 14 is preferably treated in the same way, at program points 45 and 50, as the error function of the first program 13 and corresponding reaction functions are initiated.

If it results from the inquiry at program point 80 that an error function of the first or second program 14 has not been determined, it is subsequently branched to program point 85.

The inquiry whether the first program 13 and the second program 14 are completed or whether an end signal has been outputted via the input 7 occurs at program point 85. If this is not the case, it is branched to program point 75. Correct functioning of the first program 13 and the second program 14 is monitored at program point 75.

If it results from the inquiry at program point 85 that the first program 13 and the second program 14 are completed or that an end signal has been entered, it is branched to program point 90. The master program 16 ends at program point 90.

In a special embodiment of the invention, the operating system has a monitor program independently monitoring the correct functioning of the first program 13 and the second program 14. If the monitor program recognizes an error function of the first program 13 or of the second program 14, the monitor program informs the master program 16 of the determined error function of the corresponding program. Corresponding to the method steps 45 and 50, the master program 16 subsequently carries out a corresponding processing and a start of a corresponding reaction process.

Preferably, the processing of a program address is fixed within a fixed runtime by the operating system when the first program 13 and the second program 14 function correctly. The operating system recognizes an error function when the program address is not processed within the runtime.

The reaction functions are deposited in the error table 17 by pure numerical values, for example, whereby the master program 16 starts an allocated reaction function for each numerical value. Another advantageous embodiment of the reaction function provides that a program, which is dependent on the faulty program, is not started when a faulty program is recognized.

In a further embodiment of the invention, identifiers for the error functions, which are processed as reaction functions when an error function occurs, are deposited in the error table 17.

Another reaction function with respect to the determination of an error function of a program at program point 50 is that a further program is started, for example. The further program can be represented by the third program 19, for example. The third program 19 can be a program that is modified in view of the faulty program with respect to data, parameters or algorithm sections, for example.

Figure 4:
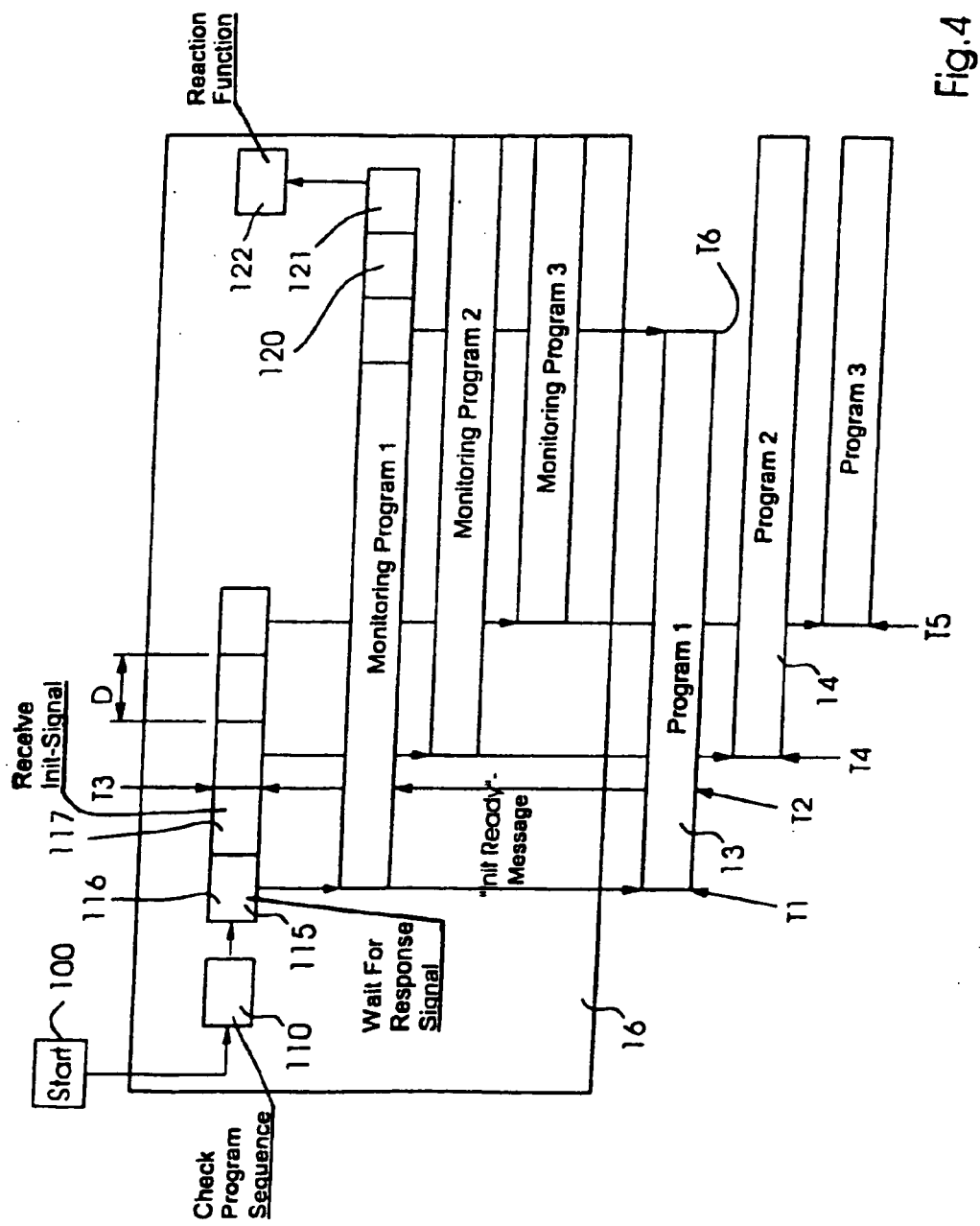
FIG. 4 is a schematic diagram illustrating an exemplary implementation for three programs.

In a block diagram, FIG. 4 shows a realized example for three programs 13, 14, 19. The operating system 15 starts the master program 16 at program point 100. On the basis of the data in the memory area 12, the master program 16 checks at the following program point 110 which programs are to be started in which order. For example, a configuration file can be read out for this purpose. In the described exemplary embodiment, the first program 13 is started first at the following program point 115. The master program 16 starts the first program 13 at the time T1 and simultaneously monitors the correct functioning of the first program 13 after the start. After the first program 13 has been started, the master program 16 waits, in the period 116, for a response signal of the first program 13. The first program 13 outputs an Init-signal at the time T2 to the master program 16. The Init-signal indicates that the first program 13 has completed the start and initialization phase. After receiving the Init-signal at program point 117 at the time T3, the master program 16 begins the start of the second program to be started, which is represented by the second program 14 in this exemplary embodiment. The master program 16 starts the second program 14 at the time T4. The master program 16 subsequently monitors the correct functioning of the second program 14. The master program 16 also waits for a prescribed fixed waiting time D before the master program 16 starts the third program 19 to be started at the time T5. The master program 16 starts the third program 19 at the time T5 and simultaneously monitors the correct functioning of the third program 19. As can be seen from the schematic block diagram, the master program 16 simultaneously checks whether the first, second and third started program 13, 14, 19 functions properly.

The first program 13 ends at the time T6. The master program 16 recognizes the end of the first program 13 and carries out an analysis of the first program 13. For example, it is checked in the following analysis 120 whether the first program 13 has been completed on time or too early or, respectively, too late and an action 121 is performed if necessary. If the result of the analysis is that the first program 13 has been completed too early or too late, the master program 16 executes a reaction function that is prescribed in the error table. In the described exemplary embodiment, the reaction function is that a display field 122 is displayed at the display 6. The program for processing the described method can be stored in any type of storage medium, particularly in the data and program memory 3.

I claim:

1. A method for controlling a program run of a central data processor, the method which comprises:
   initially starting a master program;
   checking, with the master program, which ones of a plurality of application programs are to be started based on a list;
   reading out, with the master program, a start sequence of the application programs to be started from a table;
   starting, with the master program, the application programs to be started according to the start sequence; and
   monitoring a functioning of the application programs by the master program.

2. The method according to claim 1, which comprises providing the master program such that the master program waits for a given period of time after a first one of the program has been started before the master program starts a second one of the programs.

3. The method according to claim 1, which comprises:
   subsequent to starting a first one of the programs, checking, with the master program, whether the first one of the programs has correctly run through a start and initialization phase; and
   starting, with the master program, a second one of the programs subsequent to the first one of the programs correctly running through the start and initialization phase.

4. The method according to claim 3, wherein the step of checking whether the first one of the programs has correctly run through the start and initialization phase includes at least one step selected from the group consisting of checking whether the first one of the programs reacts to inputs, checking whether the first one of the programs exchanges given data with another program, and checking whether the first one of the programs reacts to signals of a given program.

5. The method according to claim 3, wherein the step of checking whether the first one of the programs has correctly run through the start and initialization phase includes checking whether the first one of the programs exchanges given data with an operating system.

6. The method according to claim 1, which comprises:
checking, with the master program, whether one of the programs, which has started, functions correctly; and
generating, with the master program, an error signal indicating that one of the programs does not function correctly.

7. The method according to claim 6, wherein the step of checking whether the one of the programs functions correctly includes checking, with the master program, whether the one of the programs utilizes a system performance of the central data processor.

8. The method according to claim 7, wherein the step of checking whether the one of the programs utilizes a system performance of the central data processor includes checking a performance-counter value used with an operating system.

9. The method according to claim 6, wherein the step of checking whether the one of the programs functions correctly includes checking, with the master program, whether the one of the programs reacts to signals of an operating system.

10. The method according to claim 9, which comprises evaluating a performance-counter value used by the operating system.

11. The method according to claim 6, wherein the step of checking whether the one of the programs functions correctly includes checking, with the master program, whether the one of the programs outputs data.

12. The method according to claim 1, which comprises:
monitoring, with an operating system, a correct functioning of started ones of the programs;
outputting, with the operating system, an error signal to the master program when one of the programs malfunctions;
checking, with the master program, whether the one of the programs that malfunctions is a program that is to be monitored by the master program; and
outputting, with the master program, an error signal if the one of the programs that malfunctions is a program to be monitored by the master program.

13. The method according to claim 1, which comprises performing, with the master program, a reaction function when recognizing a faulty one of the programs.

14. The method according to claim 13, wherein the step of performing the reaction function includes terminating, with the master program, the faulty one of the programs.

15. The method according to claim 14, which comprises subsequently to terminating the faulty one of the programs, restarting, with the master program, the faulty one of the programs.

16. The method according to claim 13, wherein the step of performing the reaction function includes entirely restarting, with the master program, an operating system of the central data processor.

17. The method according to claim 13, wherein the step of performing the reaction function includes transmitting, with the master program, an error message to a further central data processor connected to the central data processor.

18. The method according to claim 13, wherein the step of performing the reaction function includes generating, with the master program, an indicator window on a screen such that the indicator window contains an error indication.

19. The method according to claim 1, which comprises using application programs as the programs.

20. A printing press, comprising:
a central data processor having a memory with application programs stored therein; and said central data processor being programmed to run the application programs such that initially a master program is started, such that the master program checks which ones of the application programs are to be started based on a list, such that the master program reads out a start sequence for the application programs to be started from a table, such that the master program starts the application programs to be started according to the start sequence and such that a functioning of the application programs is monitored by the master program.

21. A storage medium having processor-readable and executable programs for performing a method which comprises:
initially starting a master program;
checking, with the master program, which ones of a plurality of application programs are to be started based on a list;
reading out, with the master program, a start sequence of the application programs to be started from a table;
starting, with the master program, the application programs to be started according to the start sequence; and
monitoring a functioning of the application programs by the master program.

* * * * *